Sept. 5, 1950         L. D. OVERLAND         2,521,403
METHOD OF MAKING ICE CREAM SANDWICHES AND TO ICE
CREAM SANDWICHES AND WRAPPERS THEREFOR
Filed May 27, 1949
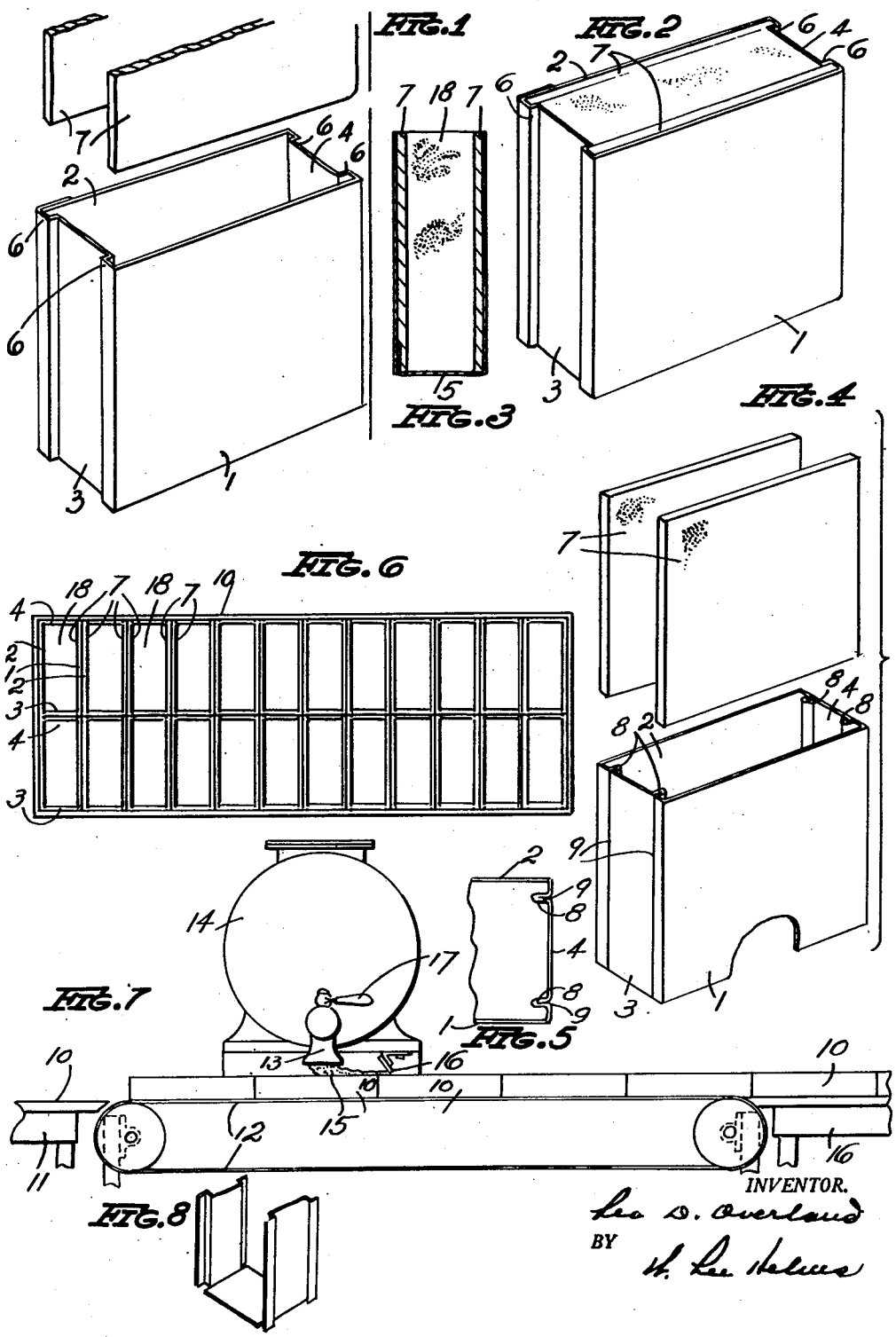
INVENTOR.
Leo D. Overland
BY
H. Lee Helms Patented Sept. 5, 1950

2,521,403

UNITED STATES PATENT OFFICE 2,521,403

METHOD OF MAKING ICE-CREAM SANDWICHES AND TO ICE-CREAM SANDWICHES AND WRAPPERS THEREFOR

Leo D. Overland, Brooklyn, N. Y.

Application May 27, 1949, Serial No. 95,794

11 Claims. (Cl. 99—180)

This invention relates to a method of making and packaging ice cream sandwiches and to ice cream sandwiches wrapped and packaged for distribution and sale.

Ice cream sandwiches consist of a block of ice cream, usually rectangular in shape, between two wafers of edible cake or cracker. It is important that the cost of manufacturing, distributing and handling ice cream sandwiches be as low as possible since ice cream sandwiches must be made to sell at low cost. At the same time it is important that the retail customers receive the sandwiches in good condition and that they be attractive in appearance and convenient to handle when carried and while being eaten.

Accordingly, one of the principal objects of this invention is to provide a method of making ice cream sandwiches whereby the sandwiches may be made quickly and at low cost, and a method whereby attractively and conveniently wrapped ice cream sandwiches may be made quickly and at low cost and economically in large quantities.

Another object of this invention is to provide an ice cream sandwich wrapped in an attractive manner, yet inexpensively, and so wrapped that the wrapped sandwiches may be packaged inexpensively and in a manner convenient for distribution in quantities; and singly are attractive in appearance and convenient to handle for sale and consumption; and another object of this invention is to provide such a wrapper for ice cream sandwiches.

A further object of this invention is to provide a method of making a package containing a quantity of wrapped ice cream sandwiches and whereby the cost of making and packing and distributing the sandwiches is reduced; and another object of this invention is to provide a package of wrapped ice cream sandwiches and which package is inexpensive and keeps the sandwiches in good condition and whereby the sandwiches may be conveniently distributed to the trade and to retail purchasers; the packages permitting the easy and convenient withdrawal and sale of the sandwiches singly.

Other objects of this invention will be in part obvious and in part pointed out hereinafter.

In accordance with this invention two edible cake or cracker-like wafers are supported in definite spaced parallel relation, then a flowable ice cream mix is flowed into the space between the wafers to fill the space and then the ice cream filling with the wafers on the two sides thereof is subjected to a low enough temperature to freeze the ice cream solid. The wafers may be supported in their parallel spaced relation by a wrapper having interior means for so supporting the wafers when properly placed in the wrapper. The flowable ice cream mix may then be flowed between the wafers in the wrapper to fill the space between them. The wrapper is preferably left on the sandwich during the freezing, storage and distribution and the sandwich may be sold to the consumer wrapped. The wrappers permit a plurality of pairs of spaced wafers ready to receive ice cream between them to be packed in a flat container without any partitions therein being required, and then the ice cream filling introduced by passing the container so packed beneath a nozzle from which ice cream flows. Then the package may be conveyed to the freezing room, and after freezing placed in storage and distributed as a package containing a quantity, such as 24 for instance, wrapped ice cream sandwiches.

The invention, accordingly consists in the method steps and in the features of construction which will be more clearly pointed out hereinafter and the scope of the application of which will be set forth in the claims that follow.

In order that a clearer understanding of this invention may be had, attention is hereby directed to the accompanying drawings, forming a part of this application and illustrating certain possible embodiments of this invention, and in which:

Figure 1 is a perspective view of a wafer supporting wrapper, and showing two wafers about to be entered into proper position in the wrapper to receive the ice cream filling;

Figure 2 is a perspective view of a completed wrapped ice cream sandwich;

Figure 3 is a vertical sectional view of the wrapper with the two wafers in proper position therein and ice cream filling the space between the wafers;

Figure 4 is similar to Fig. 1 but shows a modified form of wrapper;

Figure 5 is a top elevation of an end portion of the wrapper shown in Fig. 4;

Figure 6 is a top elevation of a package containing a plurality of wrapped ice cream sandwiches;

Figure 7 is a diagrammatic view in front elevation showing an apparatus for filling the sandwiches; and Figure 8 is a perspective view of an insert for a rectangular band or open-top box having flat side and end walls to form therewith a wrapper for an ice cream sandwich and for use in their manufacture.

Similar reference characters refer to similar parts throughout the several views of the drawings.

Referring to the drawings, there is provided a wrapper of rectangular shape and which in Figs. 1, 2 and 3 is shown to have side walls 1 and 2, end walls 3 and 4, a bottom 5, but no top. The end walls 3 and 4 are deformed to present abutments in the form of shoulders 6 in the interior of the wrapper and extending from the top to the bottom thereof and each spaced from an adjacent side wall 1 and 2 a distance approximating the thickness of a sandwich wafer such as 7, thus forming channels in the interior of the wrapper at each end of the side walls 1 and 2 into which opposite side edges of a wafer 7 may be slid and snugly received and be supported therein. Preferably the height of the wrapper is the same as the corresponding cross dimension of the wafer 7.

In the modification shown in Figs. 4 and 5 the interior channels in the wrapper and in which the wafers 7 are received and supported are formed by inwardly directed abutments in the form of folds 8 formed by doubling portions of the end walls inwardly, and if desired placing adhesive in the grooves 9 of the folds. In this modification the wrapper has neither a bottom nor a top.

To facilitate and to reduce the cost of filling the space between the wafers in the wrappers with ice cream a plurality, for instance twenty-four of the wrappers with wafers 7 properly supported therein are packaged in a carton or container 10 which may be merely a rectangular box of cardboard or other suitable material with an open top. The wrappers with the wafers supported therein are placed in the container in abutting relation with their open tops upward; and no partitions in the carton or container are required. The containers so packed may then be passed to a filling apparatus. For instance, as diagrammatically shown in Fig. 7, the packed carton or containers 10 may be fed one after the other from a feed table 11 to an endless continuously traveling belt 12 which carries the packages past the valved discharge nozzle 13 of a continuous ice cream mixer and freezer 14 with such timing in relation to the rate of discharge of ice cream 15 from the nozzle that the spaces between the wafers 7 in the containers 10 are completely filled, or more so, as the containers move past the nozzle. The belt 12 then carries the containers 10 past a wiper 16 which wipes off excess ice cream and then conveys the containers to a delivery table 16 from which the packed containers are taken to a hardening room. When the ice cream is properly hardened the containers which now contain wrapped hard frozen ice cream sandwiches are placed in storage or distributed to the trade.

If desired, after the ice cream filling has been introduced between the pairs of wafers supported in their wrappers and in the cartons or containers, the cartons or containers may be covered by placing ordinary lid covers thereon and may be taken to the freezing room and distributed to the trade with their covers on.

The ice cream freezer 14 may be of the type now available on the market and is preferably of the continuously operating type, and the operating handle of the nozzle valve thereof is indicated at 17, 18 indicates the ice cream filling in the ice cream sandwiches. Also any suitable mechanism may be employed to carry the cartons or containers to and from the filling nozzle of the freezer 14; or the cartons or containers may be moved by hand.

It is apparent from the above that the method described above of making ice cream sandwiches is simple, effective and inexpensive and that the wrapped ice cream sandwiches and the packages of such sandwiches are convenient and inexpensive to store and to distribute, and that the wrapped ice cream sandwiches singly are attractive in appearance, are well protected from being damaged by handling and are convenient to handle while carried about and while being consumed.

It is understood that all matter contained in the above description or shown in the accompanying drawings be interpreted as illustrative and not in a limiting sense. Thus in Fig. 8 I have shown a deformed strip of light cardboard formed in accordance with the side walls and bottom of the structure shown in Figs. 1 and 2, to be used as an insert for an open top box having a bottom and flat side and end walls, and such a strip can also be used with a box-like casing open at both top and bottom since the base of the strip will form a bottom for such structure.

By means of the invention the product may be made without application of the human hand, since the wafers may be readily placed in position by machine-feed from a stack or stacks, and therefore ideal sanitary factors are present.

What is claimed is:

1. The method of making a wrapped ice cream sandwich composed of a block of hardened ice cream between two edible wafers and contained in a wrapper, which method comprises holding two edible wafers in a wrapper in parallel, spaced mutually facing relation therein and against movement toward each other, filling the space between said wafers while so held in the wrapper with ice cream in plastic condition, and then hardening the ice cream in situ between the wafers while so held in the wrapper.

2. The method of making a plurality of wrapped ice cream sandwiches, each product consisting of a block of hardened ice cream, between two edible wafers and enclosed in a wrapper, which method includes holding each of a plurality of pairs of wafers in a wrapper having an open top, each pair of wafers being in parallel, spaced, mutually facing relation in their wrapper and held therein against movement toward each other and each wafer of the pairs having an edge at the open top of the wrapper, confining a plurality of said pairs of wafers so wrapped in a container having an open top with the tops of the wrappers exposed at the top of the container, filling the spaces between each pair of wafers while so held in their wrappers and while in the container with ice cream in plastic condition, and then hardening the ice cream in situ between the wafers while so held in the wrappers and while in the container.

3. The method of making a wrapped edible product consisting of a block of hardened ice cream between two edible wafers and contained in a wrapper having opposite walls, which method includes placing two edible wafers in parallel, spaced, mutually facing relation against the inner faces of opposite walls of a wrapper, holding the wafers in said positions in the wrapper and against movement toward each other, filling the space between said wafers while so positioned and held in the wrapper with ice cream in plastic condition, and then hardening the ice cream in situ between the wafers while so positioned and held in the wrapper.

4. An article of manufacture which comprises a wrapper open at the top and having opposite side walls and opposite end walls, two ice cream sandwich wafers enclosed in the wrapper and respectively positioned close to and parallel with the opposite side walls of the wrapper, and abutments so located in the interior of the wrapper as to abut the inner face of each wafer when in position close to and parallel with a side wall of the wrapper holding said wafers close to said wrapper walls.

5. An article of manufacture which comprises a wrapper open at the top and having opposite side walls and opposite end walls, two ice cream sandwich wafers enclosed in the wrapper and respectively positioned close to and parallel with the opposite side walls of the wrapper, said wrapper having shoulders extending from said end walls inwardly of the wrapper and so located in the interior of the wrapper as to abut the inner face of each wafer when in position close to and parallel with said side walls of the wrapper holding said wafers close to said wrapper walls.

6. A wrapper for an ice cream sandwich, the wrapper being open at the top and having opposite end walls and opposite side walls of greater length than the length of the end walls, inwardly extending abutments along each end of each end wall and equally spaced from its adjacent side wall and each abutment forming with said side wall a right angular channel adapted to receive an ice cream sandwich wafer whereby wafers are held against said wrapper side walls, each end wall having a smooth uninterrupted surface extending from each one of its said abutments to the other.

7. A wrapper for an ice cream sandwich, the wrapper being open at the top and having opposite end walls and opposite side walls of greater length than the length of the end walls, inwardly extending abutments formed on the inner faces of said end walls along each end of each end wall equally spaced from its adjacent side wall and each abutment forming with said side wall a right angular channel adapted to receive an ice cream sandwich wafer whereby wafers are held against said wrapper side walls.

8. A wrapper for an ice cream sandwich, the wrapper being open at the top and having opposite end walls and opposite side walls of greater length than the length of the end walls, said end walls being indented inwardly and presenting inwardly extending shoulders along each end of each end wall equally spaced from its adjacent side wall and each shoulder forming with said side wall a right angular channel adapted to receive an ice cream sandwich wafer whereby wafers are held against said wrapper side walls.

9. A wrapper for an ice cream sandwich, the wrapper being open at the top and comprising a sheet of cardboard folded to provide opposite end walls and opposite side walls of greater length than the length of the end walls, each end wall being inwardly deformed near the side walls to provide two abutments, each slightly spaced from its adjacent side wall, and the two abutments of each end wall being joined by a relatively wide continuous smooth-surfaced intermediate portion, each abutment forming with its adjacent side wall an ice cream sandwich wafer receiving channel whereby two wafers are held against said wrapper side walls.

10. A wrapper for an ice cream sandwich, which wrapper comprises a rectangular box part open at the top and having opposite end walls and opposite side walls of greater length than the length of the end walls, said box part having an insert therein presenting inwardly extending abutments along each end of each box part end wall and equally spaced from the adjacent box part side wall and each abutment forming with said side wall a right angular channel adapted to receive an ice cream sandwich wafer whereby wafers are held against said box part side walls.

11. A wrapper for an ice cream sandwich, which wrapper comprises a rectangular box part open at the top and having opposite end walls and opposite side walls of greater length than the length of the end walls, said box part having a U-shaped insert therein, the insert having a bottom disposed flatwise along the bottom of the box part and having opposite end pieces extending upwardly from the ends of the insert bottom and along the end walls of the box part, said end pieces having inwardly extending abutments along each end of each box part end wall and equally spaced from the adjacent box part side wall and each abutment forming with said side wall a right angular channel adapted to receive an ice cream sandwich wafer whereby wafers are held against said box part side walls.

LEO D. OVERLAND.

REFERENCES CITED

The following references are of record in the file of this patent:

UNITED STATES PATENTS

| Number | Name | Date |
|---|---|---|
| Re. 19,153 | Battista | May 1, 1934 |
| 331,385 | Durham | Dec. 1, 1885 |
| 1,755,699 | Loehr | Apr. 22, 1930 |
| 1,773,031 | Crescio | Aug. 12, 1930 |
| 1,968,183 | Vogt | July 31, 1934 |
| 2,136,505 | Hirschson | Nov. 15, 1938 |
| 2,176,284 | Whiteford | Oct. 17, 1939 |
| 2,248,651 | Von Losberg | July 8, 1941 |
| 2,347,162 | Watts | Apr. 18, 1944 |
| 2,431,535 | Bergstrom | Nov. 25, 1947 |